(12) United States Patent
Rouland et al.

(10) Patent No.: US 10,492,088 B2
(45) Date of Patent: Nov. 26, 2019

(54) TECHNIQUE FOR ACCESSING AT LEAST ONE ADMINISTRATION SERVER

(71) Applicant: Orange, Paris (FR)

(72) Inventors: Julien Rouland, Saint Martin d'Heres (FR); Nordine Oulahal, Grenoble (FR); Marc Douet, Voreppe (FR)

(73) Assignee: ORANGE, Paris (FR)

( * ) Notice: Subject to any disclaimer, the term of this patent is extended or adjusted under 35 U.S.C. 154(b) by 92 days.

(21) Appl. No.: 15/532,487

(22) PCT Filed: Nov. 26, 2015

(86) PCT No.: PCT/FR2015/053234
§ 371 (c)(1),
(2) Date: Jun. 1, 2017

(87) PCT Pub. No.: WO2016/087751
PCT Pub. Date: Jun. 9, 2016

(65) Prior Publication Data
US 2018/0338251 A1    Nov. 22, 2018

(30) Foreign Application Priority Data
Dec. 4, 2014 (FR) .................................. 14 61931

(51) Int. Cl.
*H04W 24/04* (2009.01)
*H04L 12/24* (2006.01)
(Continued)

(52) U.S. Cl.
CPC ......... *H04W 24/04* (2013.01); *H04L 41/0803* (2013.01); *H04W 84/22* (2013.01); *H04W 88/04* (2013.01); *H04W 88/08* (2013.01)

(58) Field of Classification Search
CPC ..... H04W 24/04; H04W 84/22; H04W 88/04; H04W 88/08; H04L 12/24; H04L 41/0803
See application file for complete search history.

(56) References Cited

U.S. PATENT DOCUMENTS 7,522,904 B1 *   4/2009 Zhu ..................... H04L 12/2898
                                                370/338
2005/0246431 A1 * 11/2005 Spitaels .............. H04L 12/4625
                                                709/222
(Continued)

FOREIGN PATENT DOCUMENTS

WO    WO-2015071395 A1 *  5/2015  .......... H04W 84/047

OTHER PUBLICATIONS

International Search Report and Written Opinion dated Feb. 1, 2016 for Application No. PCT/FR2015/053234.
(Continued)

*Primary Examiner* — Benjamin H Elliott, IV
(74) *Attorney, Agent, or Firm* — Knobbe, Martens, Olson & Bear, LLP

(57) ABSTRACT

A technique for accessing at least one administration server connected to a wide area communication network is disclosed. An access point allowing access to the wide area communication network detects a wireless administration network dedicated to an exchange of administration data with the at least one administration server. Following this detection, the access point connects to this wireless administration network and activates this administration network by itself in repeater mode, in which it repeats data received on said wireless network. This allows a device to exchange administration data with the administration server when a fault affecting its access to the wide area communication network occurs.

13 Claims, 4 Drawing Sheets

(51) Int. Cl.
  *H04W 84/22* (2009.01)
  *H04W 88/04* (2009.01)
  *H04W 88/08* (2009.01)

(56) References Cited

U.S. PATENT DOCUMENTS

| | | | |
|---|---|---|---|
| 2013/0151893 A1* | 6/2013 | Gorecha | G06F 11/0736 714/15 |
| 2014/0341109 A1* | 11/2014 | Cartmell | H04L 45/308 370/328 |
| 2015/0074245 A1* | 3/2015 | Ma | H04L 67/32 709/220 |
| 2015/0327052 A1* | 11/2015 | Ghai | H04W 48/02 370/328 |
| 2018/0227649 A1* | 8/2018 | Corbin | H04Q 9/00 |
| 2018/0338251 A1* | 11/2018 | Rouland | H04W 24/04 |

OTHER PUBLICATIONS

Anonymous, Information technology—Telecommunications and information exchange between systems—Local and metropolitan area networks—Specific requirements, Part 11: Wireless LAN Medium Access Control (MAC) and Physical Layer (PHY) Specifications, Jan. 1, 2003, IEEE Standard, pp. 1-513.

* cited by examiner

TECHNIQUE FOR ACCESSING AT LEAST ONE ADMINISTRATION SERVER

RELATED APPLICATIONS

This application is the U.S. National Phase of Application No. PCT/FR2015/053234 entitled "TECHNIQUE FOR ACCESSING AT LEAST ONE ADMINISTRATION SERVER" filed Nov. 26, 2015, which designated the United States, and which claims the benefit of French Application No. 1461931 filed Dec. 4, 2014.

The invention relates to the general field of telecommunications.

More particularly, the invention relates to the access by a device to at least one administration server connected to a wide area communication network when a fault affecting access to the wide area communication network occurs.

To ensure that a quality service is provided, it is preferable for a network operator to be able to administer devices remotely.

In order to carry out the remote administration of devices, it is necessary, notably,
- to detect and recognize the administered devices, for example their serial numbers and their hardware and software versions;
- to monitor these devices, for example by obtaining monitoring information and performance indicators.

In a local network, an access gateway enables, notably, devices located at a client site to access a wide area communication network (or WAN, for "Wide Area Network"), such as the Internet. These devices are also called CPE, for "Customer Premises Equipment". For a local network, such devices may be, notably, the access gateway, a "Set-Top Box" TV decoder, or a mobile terminal. In the context of a home-automation network, such devices may be household appliances, alarm systems or sensors.

The remote management of the devices of a local network is based, for example, on a technical report produced by the Broadband Forum, TR-069, "CPE WAN Management Protocol". This technical report defines a CWMP protocol, for communication between an administration server, called the remote auto-configuration server ACS (for "Auto-Configuration Server"), and a device of the local network. The CWMP protocol defines a mechanism which provides, notably, for secure auto-configuration of the devices of the local network and other functions for managing these devices.

It is, notably, possible for the network operator to carry out remote operations such as:
- updating the software or the microcode ("firmware") of a device, when a change in the software version or microcode is required;
- carrying out diagnostics if a device shows a malfunction;
- dynamically installing and configuring new services;
- monitoring the state and performance of a device.

The CWMP protocol is based on the Internet protocol, or more precisely on TCP/IP (for "Transmission Control Protocol"). The data required for the remote administration of the devices of the network, for example diagnostic assistance data, are transmitted by each device to the administration server by means of the CWMP protocol. If access to the wide area communication network (WAN) via the access gateway ceases to be possible, it then becomes impossible to contact the administration server in order to transmit administration data such as diagnostic assistance data to it. It is therefore impossible for a customer support adviser of the operator to retrieve the administration data automatically if the access gateway ceases to provide access to the wide area communication network. The adviser must then verbally question the customer in order to establish a technical diagnosis, making this task difficult and unreliable. Moreover, the adviser is unable to perform remote administration actions. This situation causes the local network user to become dissatisfied with his network operator.

The same access problems arise for any type of remotely administered device, when the device has no access to the wide area communication network.

One of the objects of the invention is to overcome some deficiencies and/or drawbacks of the prior art and/or to make improvements thereto.

In a first aspect, the invention proposes a method for accessing at least one administration server connected to a wide area communication network, comprising:
- the detection, via an access point allowing access to the wide area communication network, of a wireless network dedicated to an exchange of administration data with the at least one administration server, called a wireless administration network;
- when the wireless administration network is detected, connection by the access point to said wireless network and activation by the access point of said wireless network in repeater mode, in which the access point repeats data received on said wireless network.

An access point may equally well be either an access gateway enabling the devices of a local network to access the wide area communication network, or a device offering an access point function, such as a mobile terminal having radio access to the wide area communication network.

A fault affecting access to the wide area communication network may be, for example, in the case of a device of a local network, a fault in a hardware element of an access point contributing to this access, or a fault associated with the connection of an access point to the access network.

By means of the method, a wireless network dedicated to an exchange of administration data is thus created by the various access points administered by the same network operator. When the administration network is detected by the access point concerned, there is already an access point called the main access point, the radio range of which covers the access point concerned, making it possible to access the wide area communication network to exchange administration data. The access point concerned is then configured in repeater mode and is a secondary access point.

If a fault affecting access to the wide area communication network via the secondary access point occurs, one or more items of administration data, for example diagnostic assistance data, may be transferred by means of the wireless administration network to an administration server, and administration instructions may be received in return, for the purpose of restoring the operating condition. This enables the administration server to view the type of fault affecting access to the wide area communication network, and to initiate corrective action if appropriate. At present, a local network user must contact an after-sales service adviser and report the fault to him. Generally, the user is not able to provide detailed information about the type of fault. By using the access method, a certain number of faults may be resolved directly from the administration server without the user's intervention. The administration server may initiate corrective action adapted to the current fault, requiring no action by the user. The user path is simplified and the duration of the fault may be reduced in most cases of faults. This also enables the administration server to detect a fault in the access network, this fault affecting a plurality of access gateways. This backup administration network thus provides added value for the network operator, extending his capacities of administration and diagnosis, to offer a better customer experience.

This administration network is used solely if access to the wide area communication network is lost. For example, the administration of the local network device continues to be provided via the nominal access point, in the absence of a fault. Thus, for most of the time, the wireless administration network, called the backup administration network, carries no administration data.

In a particular embodiment, the backup administration network is hidden; in other words, the identifier of this network is not broadcast. Only the devices managed by the network operator are provided with information enabling them to access it.

It is emphasized here that the use of the method does not require the addition of any equipment to the network, but is based on a local network infrastructure. Thus the proposed solution is very simple to implement.

In a particular embodiment, the wireless administration network is intended solely for the exchange of administration data if a fault affecting access to the wide area communication network has occurred.

The different forms or characteristics of embodiment mentioned below may be added, independently or in combination with one another, to the steps of the access method as defined above.

In a particular embodiment, the access method further comprises, if the wireless administration network is not detected and if there is no fault affecting access to the wide area communication network, the activation by the access point of the administration network allowing direct access to said administration server.

In this embodiment, a main access point having access to the wide area communication network in an operating state creates the wireless network dedicated to administration in main mode, and, if there is no fault affecting its access to the wide area communication network, provides access to the administration server for administration data. This main access point acts as an access gateway for one or more devices of a main local network. A secondary access point maintains a connection with the main access point, directly or via one or more other access points, and locally creates the wireless network dedicated to administration in repeater mode. Thus a communications network dedicated to administration is created in grid form.

A device which, because of a fault, does not have its nominal access to the wide area communication network may, in successive rebounds, access a main access point allowing access to the administration server.

A device of a local network other than the main network or other than a network managed by the network operator may thus be administered via the main access point if a fault affecting access to the wide area communication network occurs.

According to a particular characteristic, the access method further comprises the detection of a disconnection of the wireless administration network, and, if there is no fault affecting access to the wide area communication network, the activation by the access point of the wireless administration network allowing direct access to said administration server.

It should be pointed out here that, in this embodiment, following the detection of the administration network, the access point has connected thereto and has activated the administration network in repeater mode. If the administration network ceases to be detected, the access point can no longer have any connection to the administration server through a main access point. If it has access to the wide area communication network in an operating state, it then activates the administration network in main mode, and itself becomes a main access point, in order to create a local area of access to the wide area communication network for the backup administration.

According to a particular characteristic, a device administered by the administration server connects to the wireless administration network when it detects it.

In a particular embodiment, a search of the wireless administration network is initiated following the detection of a fault affecting access to the wide area communication network.

By default, the access point opens the administration network in main mode. If a fault affecting access to the wide area communication network is detected, the access point then searches for the backup administration network so that it can exchange administration data with the administration server. It also acts as a relay for other devices by becoming a repeater of the administration network. This operating mode has the advantage of being simpler for routing the administration data.

According to a particular characteristic, a device administered by the administration server connects to the wireless administration network when it detects an absence of access to the wide area communication network.

In a second aspect, the invention also relates to an access point for accessing a wide area communication network, comprising:

a module for detecting a wireless network dedicated to an exchange of administration data with at least one administration server connected to the wide area communication network;

a module for connecting to said wireless network when said network is detected;

a module for activating said wireless network, arranged to activate the network in repeater mode, in which the access point repeats data received on said wireless network, when said network is detected.

The advantages mentioned for the access method according to the first aspect are directly transferable to the access point.

According to a third aspect, the invention also relates to a device administered by at least one administration server connected to a wide area communication network, said device comprising:

an administration module, arranged to exchange administration data with the administration server (31);

a module for detecting a wireless network dedicated to an exchange of administration data with the at least one administration server;

a module for connection to the administration network, acting as the backup administration network.

The advantages mentioned for the access method according to the first aspect are directly transferable to the device.

According to a particular characteristic, the device further comprises a module for detecting a fault affecting access to the wide area communication network, the connection module being activated on the detection of said fault.

According to a fourth aspect, the invention also relates to an administration system comprising at least one access point according to the second aspect and at least one device according to the third aspect.

The advantages mentioned for the access method according to the first aspect are directly transferable to the system.

According to a fifth aspect, the invention concerns a program for an access point, comprising program code instructions intended to cause the execution of those of the steps of the access method described above that are executed by the access point, when this program is executed by this access point, and a recording medium, readable by an access point, on which a program for an access point is recorded.

The advantages mentioned for the access method according to the first aspect are directly transferable to the program for an access point and to the recording medium.

According to a sixth aspect, the invention concerns a program for a device, comprising program code instructions intended to cause the execution of those of the steps of the access method described above that are executed by the device, when this program is executed by this device, and a recording medium, readable by a device, on which a program for an device is recorded.

The advantages mentioned for the access method according to the first aspect are directly transferable to the program for a device and to the recording medium.

The technique for accessing an administration server will be more clearly understood with the aid of the following description of specific embodiments, with reference to the attached drawings, in which.

Figure 1:
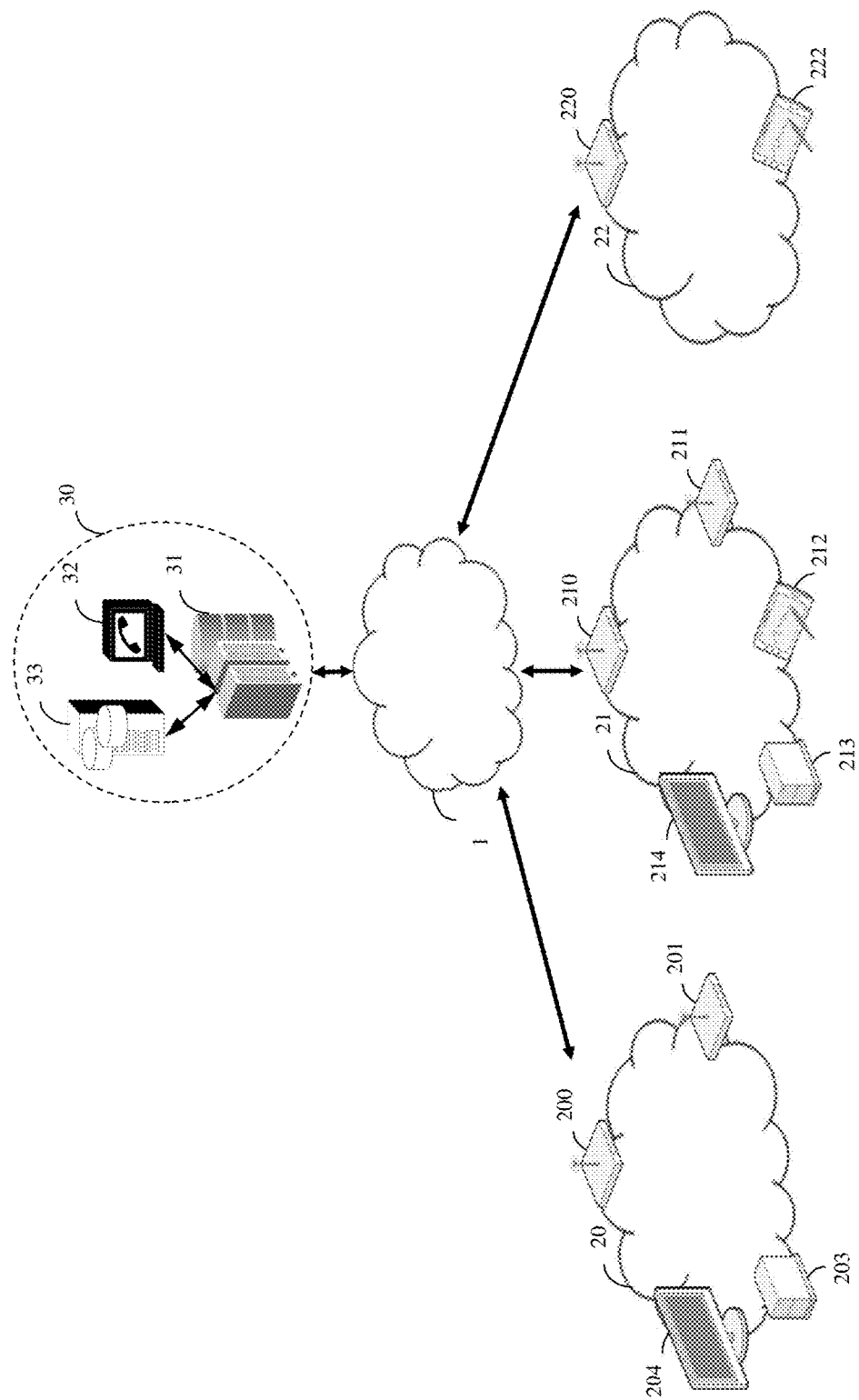
FIG. 1 shows an access system in a communications network in a particular embodiment.

FIG. 1 shows, in their environment, a plurality of private or local communication networks 20, 21, 22 administered remotely by an administration system 30. In a given local network, the IP (for "Internet Protocol") protocol is used by the devices to communicate with each other in the local network and also to communicate with a wide area communication network or WAN (for "Wide Area Network"), such as the Internet.

For the environment shown in FIG. 1, the expression "local communication network" 20, 21, 22 is taken to mean a network of the LAN ("Local Area Network") type. This network may be, in particular, a home network or a business network. An access gateway 200 is arranged to provide devices of the local network 20 with access to the wide area communication network (for example the Internet) via an access network 1. The access network 1 is, for example, an access network known as an xDSL (for "Digital Subscriber Line", where x indicates that it may be an ADSL, HSDL, VDSL, or other network). It may also be an FTTH (for "Fiber To The Home") network. No limitations are placed on the type of access network 1. An access gateway 210 is arranged to provide devices of the local network 21 with access to the wide area communication network via the access network 1 or via another access network which is not shown. An access gateway 220 is arranged to provide devices of the local network 22 with access to the wide area communication network via an access network 1 or via another access network which is not shown. The access gateways 200, 210, 220 are access points to the wide area communication network.

The local network 20, 21, 22 may equally well be either a wired network of the Ethernet type, according to the IEEE 802.3 standard, or a wireless network of the Wi-Fi type, according to the IEEE 802.11 standard, or alternatively a power line communication (PLC) network.

The devices of a local network 20, 21, 22 may be any device, for example domestic appliances, having a wired or wireless network connection. The devices may include, for example, a computer, a tablet, a cellphone, a connected radio receiver, a fixed telephone, an overhead projector, a television, a TV decoder (or "Set-Top Box"), a games console, electrical domestic appliances, or the like. A TV decoder 201, a television 204 and a computer 203 are present in the local network 20. A TV decoder 211, a television 214, a tablet 212 and a computer 213 are present in the local network 21. A tablet 222 is present in the local network 22. Some of the devices of the local network 21, 22 are also arranged to communicate directly with the wide area communication network known as the Internet, via another access network, not shown in FIG. 1, which is distinct from the access network 1. The term "directly" is taken to mean that neither the access gateway 210, 220 nor the access network 1 intervenes in these exchanges. The other access network is, for example, a third or fourth generation (3GPP) mobile network. The tablets or mobile terminals 212, 222 thus have a means for direct communication with the Internet communications network. The tablet 212, 222, can then act as an access point to the wide area communication network.

The administration system 30 contains a plurality of pieces of equipment enabling the communications network operator to administer and monitor devices, notably devices belonging to local networks, including the access gateway. The administration system 30 comprises, notably, an administration server 31, also called an auto-configuration server ACS (for "Auto-Configuration Server"), a call center 32 and operational support centers 33 OSS (for "Operational Support System") or business-oriented systems BSS (for "Business Support System").

In the embodiment described above, the administration server 31 interacts with the devices of the local network 20, 21, 22 for the purpose of their administration according to the CWMP remote management protocol ("CPE WAN Management Protocol") defined in Technical Report TR-069 by the Broadband Forum. No limitations are placed on the use of this specific protocol. In other embodiments, it is possible, for example, to use the OMA-Device Management specification defined by the OMA (for "Open Mobile Alliance") for the administration of mobile terminals.

By means of the CWMP protocol, the administration server 31 can, notably,
obtain from the local network 20, 21, 22, and remotely manage, a state of the devices connected to it;
initiate diagnostic tests;
remotely load software or microcode files, and
manage events.

The remote administration application uses the CWMP protocol and is based on the following protocol layers: TCP/IP, SSL/TLS (for "Secure Sockets Layer/Transport Layer Security"), HTTP (for "HyperText Transfer Protocol"), SOAP (for "Simple Object Access Protocol"), and RPC (for "Remote Procedure Call").

Technical Report TR-069 specifies that a device of a local network 20, 21, 22 establishes a connection with the administration server 31 under certain conditions, and an "Inform RPC" procedure is executed. During this procedure, the device of the local area network 20, 21, 22 transmits various administration data relating to it. The administration data received in this "Inform RPC" procedure are stored in a database (not shown in FIG. 1) and can then be used by the administration server 31 to perform various tasks for the administration of the device. The administration data comprise, in particular, one or more data elements for diagnostic assistance. By way of illustrative example, the LastConnectionError data element may be used to supply the cause of the last connection error in an "Inform RPC" procedure. Also by way of illustrative example, the IPPingDiagnostics, WANDSLDiagnostics or WANATMF5LoopbackDiagnostics data or objects may be used to supply more detailed diagnostic information in an "Inform RPC" procedure. These various data are defined more precisely in the TR-069 report. In nominal mode, the exchange with the administration server takes place via the wide area communication network, that is to say via the access gateway for the devices of the local area network.

The access technique is based on the activation of a wireless network, called the backup administration network, dedicated to an exchange of administration data with the administration server 31 connected to the wide area communication network. This exchange is established when a fault affecting access to the wide area communication network appears. When such faults are not present, the administration data are routed in the nominal way. The backup wireless administration network is subsequently a Wi-Fi wireless network, and is, notably, characterized by an identifier belonging to the network operator and a security key of the network, for example a WEP (for "Wired Equivalent Privacy") or WPA (for "Wi-Fi Protected Access") key. A mechanism for filtering data intended for the administration server or servers is used, so that only the data relating to the administration and diagnostics of the devices are accepted.

In a particular embodiment, the administration network is hidden; in other words, the network identifier is not broadcast. It is known by the devices administered by the network operator.

A mechanism for accepting and rejecting requests for connection to the administration network is used at the access points, in order to accept only the connection requests of devices administered by the network operator.

In a particular embodiment, an authentication phase may be executed to prove that the device is authorized to connect to the administration network.

It should be noted here that the administration network is used only if the connection between the local network and the wide area communication network is lost. In normal conditions, no traffic is routed on this administration network. In these conditions, the exchanges between the administration server and the device of the local network take place via the access gateway of the local network, that is to say via its nominal access.

The access points executing the access technique are, notably, arranged to activate the backup wireless administration network. Two modes of activation of this administration network are specified for the execution of the method, namely:

a main mode, in which the access point activates the administration network and allows direct access to the wide area communication network for administration data; and a repeater mode, in which the access point resends, or repeats, data received on the backup administration network. This repeater mode makes it possible, notably, to extend a range of radio coverage.

Figure 2A:
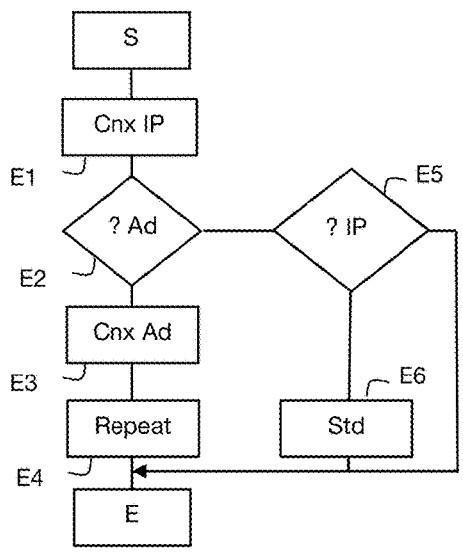
FIGS. 2a and 2b illustrate steps of an access method executed by an access point according to a first particular embodiment.
Figure 2B:
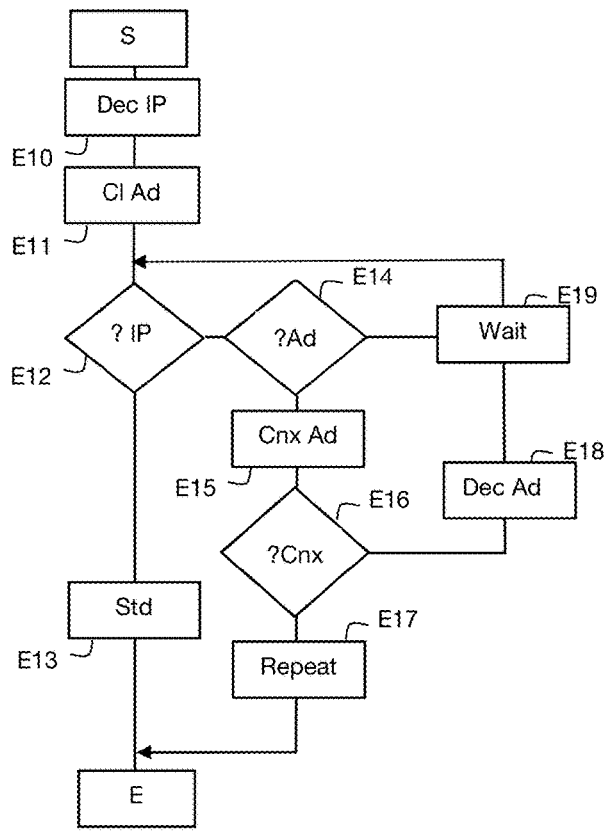
Figure 4A:
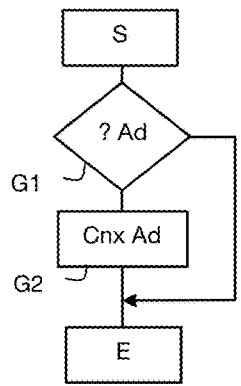
FIGS. 4a and 4b illustrate steps of the access method executed by a device according to the first particular embodiment.
Figure 4B:
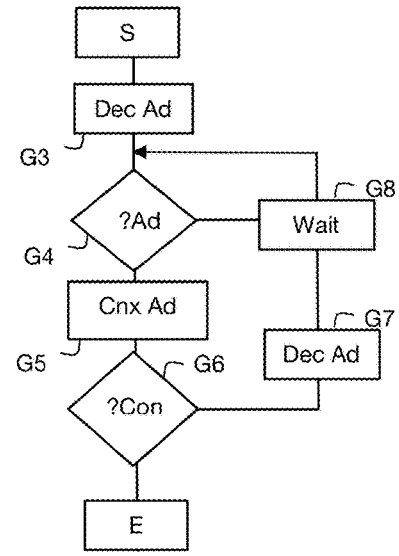

We shall now describe the administration technique in a first particular embodiment, as applied by the access points of a network operator, in relation to FIGS. 2*a* and 2*b*, and by a device administered by this operator, in relation to FIGS. 4*a* and 4*b*. In this first embodiment, the access points activate the wireless administration network in main mode or in repeater mode. A single access point allows access to the wide area communication network for the exchange of administration data with the administration server for a plurality of access points. This access point is the main access point. The other access points activate the wireless administration network in repeater mode. In an area served by these various access points, a device is able to access the backup administration network and communicate with the administration server to exchange administration data.

FIG. 2*a* shows steps of the access method executed by an access point on its initialization. It should be noted here that this access point may be either an access gateway or a device offering access to the wide area communication network.

On its initialization, in a step E1, the access point connects to the wide area communication network.

In a step E2, the access point checks that it can detect the wireless administration network. This detection takes place by means of a search for available wireless networks and the identification of the administration network among the available wireless networks.

If in step E2, the wireless administration network has been detected, another access point already acting as main access point, the access point connects to the administration network in a step E3.

In a step E4, the access point activates the wireless administration network in repeater mode. Thus, all the devices that receive this administration network may exchange administration data with an administration server by means of the administration network repeated locally, and via an access offered by the main access point.

If, in step E2, the wireless administration network is not detected, the access point checks in a step E5 whether its access to the wide area communication network is operational. If this is the case, then, in a step E6, the access point activates the administration network in main mode and acts as the main access point. It is through this access point that devices of its local network, those of other local networks, and devices administered by the network operator will be able to access the administration server.

If its access to the wide area communication network is not operational, the access point again executes step E2 while waiting for the detection of the administration network.

At the end of these initialization steps, the access point has opened the administration network either in main mode or in repeater mode. Any device in its radio coverage area may access the administration server.

FIG. 2*b* shows the steps of the access method executed by the access point when there is a loss of the administration network (while it is repeater mode) or when there is a loss of connection to the wide area communication network.

These losses are detected in a step E10. The loss of the administration network corresponds to an absence of radio detection of the administration network. The loss of connection to the wide area communication network corresponds, for example, to DSL desynchronization due to pulsed noises on the access network link, a DHCP ("Dynamic Host Configuration Protocol") problem, or a hardware fault at the interface with the access network 1. No limitations are placed on the type of fault. This fault affects access to the wide area communication network and makes any access to this network impossible: it prevents the exchange of data, notably administration data, with the administration server 31.

In a step E11, when the access point has activated the wireless administration network in repeater mode, the access point inactivates the administration network.

In a step E12, the access point checks whether its access to the wide area communication network is operational or if a fault is affecting this access.

If the access to the wide area communication network is operational, then, in a step E13, the access point activates the administration network in main mode and acts as the main access point.

If the access to the wide area communication network is not operational, then, in a step E14, the access point checks whether it can detect the administration network. If the wireless administration network is detected, the access point connects to the administration network in a step E15. In a step E16, the access point checks whether it can actually access the wide area communication network, and, if this is the case, it activates the administration network in repeater mode in a step E17. If, in step E16, the access point detects that it cannot access the wide area communication network, then, in a step E18, the access point disconnects from the administration network. In a step E19, the access point starts a waiting timer, before executing step E12 again. This waiting timer is, for example, about one hour.

If the access point does not detect the administration network in step E14, the access point then executes step E19, described above.

FIG. 4a shows steps of the access method executed by a device administered by the network operator, or more precisely by the administration server, in an initialization phase.

In a step G1, the device checks that it can detect the administration network. If this is the case, then, in a step G2, the device connects to the administration network. If this is not the case, the device may execute step G1 again on the expiry of a waiting timer, of about one hour for example.

FIG. 4b shows steps executed by a device administered by the administration server if a disconnection from the administration network has been detected (step G3).

In a step G4, the device checks that it can detect the administration network. This administration network is, for example, activated by another access point. If this is the case, then, in a step G5, the device connects to the administration network. In a step G6, the device checks that it can access the wide area communication network by means of the administration network. If this is the case, the administration network is in an operational state. If this is not the case, then, in a step G7, the device disconnects from the administration network. In a step G8, the device starts a waiting timer, before executing step G4 again. This waiting timer is, for example, about one hour.

If the device does not detect the administration network in step G4, the device then executes step G8, described above.

In this first embodiment, the administration network is always operational, and the devices are permanently connected to it. The access points form this administration network, and allow connection to the main access point at all times.

For the environment shown in FIG. 1, the access gateway 200 of the local network 20 acts as a main access point, that is to say the access point at the head end of the backup administration network. The access gateway 210 establishes a connection with the access gateway 200, and then activates the administration network in repeater mode. The devices of the local area network 21 may access the backup administration network either directly, if they receive the radio signal from the access gateway 200, or indirectly, via the access gateway 210. The access gateway 220 receives the administration network repeated by the access gateway 210, and establishes a connection with the access gateway 210. The access gateway 220 then activates the administration network in repeater mode. The devices of the local network 22 may access the administration server either via the access gateways 210 and 200, or via the access gateways 220, 210 and 200.

If the access gateways 210, 220 encounter a fault affecting their access to the wide area communication network, it is then possible to administer the devices 210, 211 of the local network 21 and those 220 of the local area network 22 by means of the backup administration network.

Figure 3A:
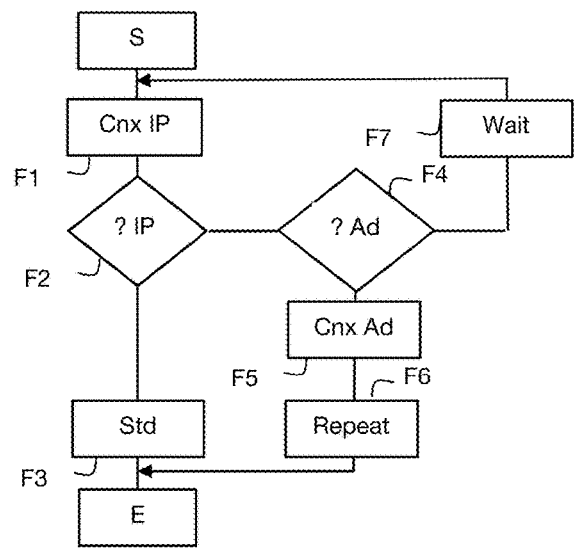
FIGS. 3a and 3b illustrate steps of an access method executed by an access point according to a second particular embodiment.
Figure 3B:
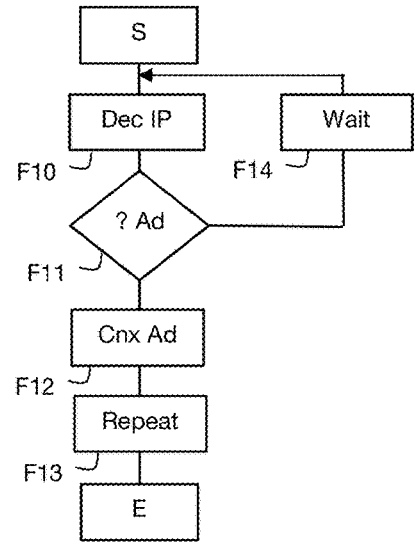
Figure 5A:
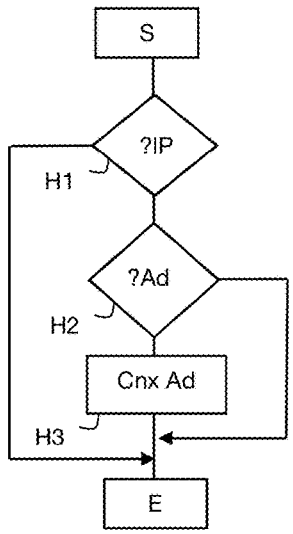
FIGS. 5a and 5b illustrate steps of the access method executed by a device according to the second particular embodiment.
Figure 5B:
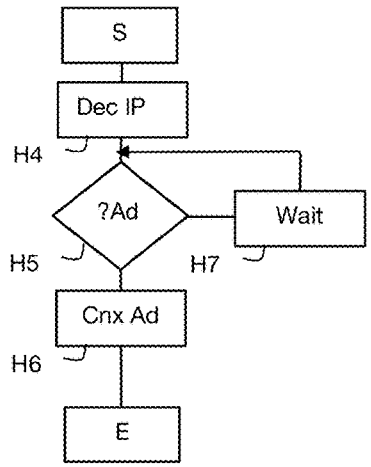

We shall now describe the access technique in a second particular embodiment, as executed by the access points, in relation to FIGS. 3a and 3b, and by a device of the local network, in relation to FIGS. 5a and 5b. In this second embodiment, an access point activates the backup wireless administration network in main mode. If a fault affecting its access to the wide area communication network occurs, the access point concerned activates the backup administration network in repeater mode.

FIG. 3a shows steps of the access method executed by an access point on its initialization. It should be noted here that this access point may be either an access gateway or a device of the local network offering independent access to the wide area communication network.

On its initialization, in a step F1, the access point connects to the wide area communication network.

In a step F2, the access point checks whether its access to the wide area communication network is operational.

If the access to the wide area communication network is operational in step F2, then, in a step F3, the access point activates the wireless network in main mode. This terminates the initialization phase.

If the access to the wide area communication network is not operational in step F2, then, in a step F4, the access point checks whether it can detect the wireless administration network.

If the wireless administration network is detected in step F4, with another access point already acting as the main access point, the access point connects to the administration network in a step F5. In a step F6, the access point activates the wireless administration network in repeater mode. Thus, all the devices that receive this administration network may exchange data with an administration server by means of the administration network repeated locally and via the main access point.

If the wireless administration network is not detected in step F4, then, in a step F7, the access point starts a waiting timer, and, on the expiry of the latter, executes step F1 again to establish a connection with the wide area communication network. This waiting timer is, for example, about one hour.

At the end of these initialization steps, the access point has opened the administration network either in main mode, if it has access to the wide area communication network, or in repeater mode, if a fault is affecting its access to this network. Any device in its radio coverage area may access the administration server.

FIG. 3b shows the steps of the access method executed by the access point when there is a loss of connection to the wide area communication network.

This loss is detected in a step F10. Examples of losses of connection have been described above in relation to step E10 of the first embodiment.

In a step F11, the access point checks that it can detect the administration network. If the administration network is detected, the access point connects to the administration network in a step F12. In a step F13, the access point activates the administration network in repeater mode.

If the administration network is not detected, then, in a step F14, the access point starts a waiting timer, before executing step F10 again in order to check whether the fault is still affecting access to the wide area communication network. This waiting timer is, for example, about one hour.

FIG. 5a shows steps of the access method executed by a device administered by the administration server and not offering the function of an access point in an initialization phase.

In a step H1, the device checks that it can access the wide area communication network.

If it does not have access to the wide area communication network, a fault affecting this access, then, in a step H2, the device checks whether it can detect the backup administration network. If this is the case, then, in a step H3, the device connects to the backup administration network. If this is not the case, the device may execute step H1 again on the expiry of a waiting timer, of about one hour for example.

FIG. 5b shows steps executed by a device administered by the administration server if a disconnection from the wide area communication network has been detected (step H4).

In a step H5, the device of the local network checks that it can detect the backup administration network. This administration network is, for example, activated by another access point. If this is the case, then, in a step H6, the device of the local network connects to the administration network.

If the device of the local network does not detect the administration network in step H5, the device starts a waiting timer, and, on the expiry of this waiting timer, it again executes step H4, described above.

Figure 3C:
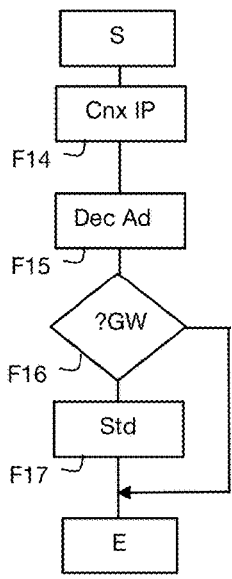
FIG. 3c illustrates steps of the access method executed by a device on the return to nominal operation in the second particular embodiment.

FIG. 3c shows the return to nominal operation of the access gateway or of a device after the re-establishment of access to the wide area communication network (step F14).

In a step F15, the device disconnects from the backup administration network.

If the device is able to provide the functions of an access point to the wide area communication network (step F16), by acting as an access gateway for example, then, in a step F17, the device activates the administration network in main mode.

Thus nominal operation is re-established.

In this second embodiment, the administration network is always operational, and the devices connect to it if there is a fault affecting access to the wide area communication network.

The access points form this administration network, and allow communication with the administration server at all times.

For the environment shown in FIG. 1, in normal operation, each of the access gateways 200, 210 and 220 respectively of the local networks 20, 21, 22 activates the backup administration network in main mode.

If the access gateway 220 encounters a fault affecting its access to the wide area communication network, it connects to the backup administration network created by the access gateway 210 and activates the administration network in repeater mode. The access gateway 210 is then the main access point of the administration network, that is to say the head of this network. It is then possible to administer the devices 220, 222 of the local network 22 by means of the backup administration network.

If, in turn, the access gateway 210 encounters a fault affecting its access to the wide area communication network, it connects to the backup administration network created by the access gateway 200 and activates the administration network in repeater mode. The access gateway 200 is then the main access point of the administration network, that is to say the head of this network. It is then possible to administer the devices 210, 211 of the local network 21 and the devices 220, 222 of the local network 22 by means of the backup administration network.

On the basis of the administration data of the device transmitted during the fault, the administration server 31 may then initiate action for the purpose of re-establishing access to the wide area communication network. The administration server 31 may also determine that a problem is located in the access network itself, when a plurality of access gateways detect an identical fault, and may initiate corrective action to re-establish access.

It is emphasized here that the backup administration network is used only to remotely administer the devices when there is a fault affecting access to the wide area communication network. It is not a matter of replacing the access offered by the access point, which is no longer operational, with that provided by the main access point, which is operational. Only the traffic associated with the administration service and with the fault is routed via the access provided by the main access point. The volume of data is thus limited by comparison with the volume of all the traffic generated by the devices of a local area network.

Figure 6:
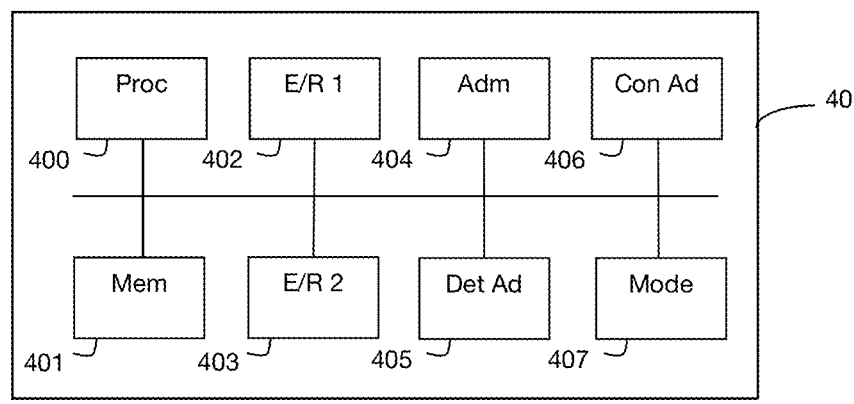
FIG. 6 shows an access point according to a particular embodiment.

We shall now describe an access point 40 to a wide area communication network in a particular embodiment, with reference to FIG. 6. Such an access point corresponds to a gateway 200, 210, 220, to a mobile terminal offering an access point function. The access point is arranged to be administered remotely by an administration server 31, and comprises, notably,

- a storage area 401, arranged to store an application comprising code instructions for executing the steps of the access method as described above;
- a storage memory (not shown), arranged to store data used in the execution of the access method, as described above:
- a processor 400 for executing code instructions of software modules;
- an interface module 402 for interfacing with an access network 1, arranged to send and receive data;
- a wireless interface module 403, arranged to send and receive data via a radio communication channel;
- an administration module 404, arranged to exchange administration data with at least one administration server 31 connected to the wide area communication network;
- a detection module 405 for detecting a wireless network dedicated to an exchange of administration data with the administration server;
- a connection module 406 for connecting to the wireless administration network when said network is detected;

an activation control module 407 for activating said wireless administration network, arranged to activate the network as a repeater (repeater mode) or as an access to the administration server (main mode).

It is emphasized here that the access point 40 also comprises other processing modules, not shown in FIG. 6, arranged to execute the various access point functions.

The administration module 404 executes, for example, the administration functions defined in the TR-069 technical report.

The interface module 402 is, for example, an xDSL module. It may also be a module for accessing a mobile communication network.

The interface module 403 is, for example, a Wi-Fi module.

In a particular embodiment, the activation control module 407 activates the administration network in repeater mode if the administration network is detected, or in main mode otherwise.

In a particular embodiment, the access point 40 also comprises a fault detection module, not shown in FIG. 6, arranged to detect a fault affecting the access of the access point to the wide area communication network via the interface module 402. In this particular embodiment, the control module 407 activates the administration network in main mode by default, or, if a fault is detected by the detection module, activates the administration network in repeater mode.

Figure 7:
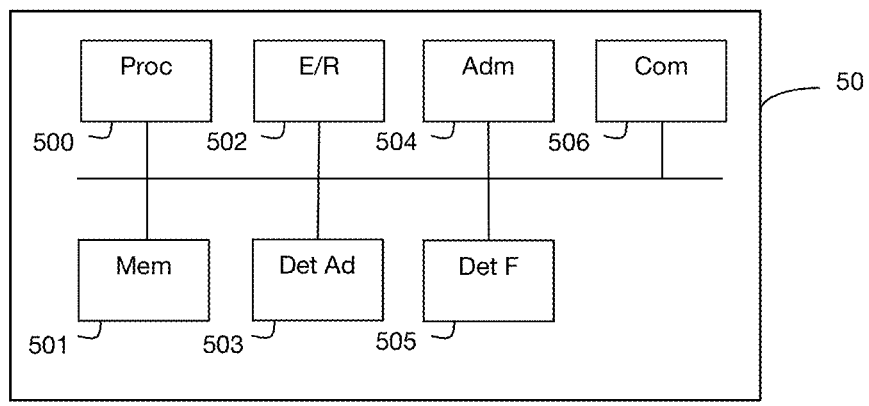
FIG. 7 shows a device according to a particular embodiment.

We shall now describe a device 50 administered by an administration server connected to a wide area communication network in a particular embodiment, with reference to FIG. 7. This device comprises, notably:

- a storage area 501, arranged to store an application comprising code instructions for executing the steps of the access method as described above;
- a storage memory (not shown), arranged to store data used in the execution of the access method, as described above;
- a processor 500 for executing code instructions of software modules;
- a wireless interface module 502, arranged to send and receive data via a radio communication channel;
- a detection module 503 for detecting a wireless network dedicated to an exchange of administration data with the at least one administration server;
- an administration module 504, arranged to exchange administration data with the administration server;
- a detection module 505 for detecting a fault affecting access to the wide area communication network;
- a control module 506, arranged to establish a connection to the administration network acting as the backup administration network.

It is emphasized here that the device 50 also comprises other processing modules, not shown in FIG. 7, arranged to execute the various functions of this device.

The administration module 504 executes, for example, the administration functions defined in the TR-069 technical report.

The interface module 502 is, for example, a Wi-Fi module.

The control module 506 is also arranged to command the administration module 504 to exchange administration data with the administration server via the backup administration network, if a fault is detected by the detection module 505.

In a particular embodiment, the connection module 506 is activated on the detection of a fault by the detection module 505.

The administration technique is executed by means of software and/or hardware components. In this context, the term "module" may equally well refer, in this document, to a software component, a hardware component, or a set of hardware and/or software components, adapted to perform a function or a set of functions as described above for the module in question.

A software component is considered to be one or more computer programs, one or more sub-programs of a program, or more generally any element of a program or a software package. This software component is stored in memory and is then loaded and executed by a data processor of a physical entity, and can access the hardware resources of this physical entity (memory devices, recording media, communications buses, input/output circuit cards, user interfaces, etc.).

Similarly, a "hardware component" is considered to be any element of a hardware assembly. It may be a hardware component that may or may not be programmable, and may or may not have an integrated processor for executing software. For example, it may be an integrated circuit, a smart card, a circuit card for executing microsoftware (firmware), etc.

In a particular embodiment, the modules 404, 405, 406, 407 are arranged to execute the access method described above. They are preferably software modules comprising software instructions for the execution of those of the steps of the access method described above executed by an access point. The invention therefore also concerns:

- a program for an access point, comprising program code instructions intended to command the execution of the steps of the access method described above, when said program is executed by this access point;
- a recording medium, readable by an access point, on which the program for an access point is recorded.

In a particular embodiment, the modules 503, 504, 505, 506 are arranged to execute the access method described above. They are preferably software modules comprising software instructions for the execution of those of the steps of the access method described above executed by a device. The invention therefore also concerns:

- a program for a device, comprising program code instructions intended to command the execution of the steps of the access method described above, when said program is executed by said device;
- a recording medium, readable by a device, on which the program for a device is recorded.

The software modules may be stored in or transmitted by a data medium. This medium may be a hardware storage medium, for example a CD-ROM, a magnetic disk or a hard disk, or a transmission medium such as an electrical, optical or wireless signal, or a telecommunications network.

The invention also relates to a system for accessing at least one administration server, comprising at least one access point 40, 200, 210, 220, 212, 222 and at least one device 50, 201, 211 as described above.

The invention claimed is:

1. A method for accessing at least one administration server connected to a wide area communication network, comprising:

detection, via an access point allowing access to the wide area communication network, of a wireless administration network dedicated to an exchange of administration data with the at least one administration server; and when the wireless administration network is detected:
   connection by the access point to the wireless administration network, and activation by the access point of the wireless administration network in repeater mode, in which the access point repeats on the wireless administration network data received on the wireless administration network; and when the wireless administration network is not detected:
verification that there is no fault affecting access via the access point to the wide area communication network; and
activation by the access point of the wireless administration network, allowing direct access to the administration server.

2. The access method as claimed in claim 1, further comprising:
the detection of a disconnection of the wireless administration network; and
if there is no fault affecting access to the wide area communication network, activation by the access point of the wireless administration network, allowing direct access to the administration server.

3. The access method as claimed in claim 1, wherein a device administered by the administration server connects to the wireless administration network when the device detects the wireless administration network.

4. The access method as claimed in claim 1, wherein a search of the wireless administration network is initiated following the detection of a fault affecting access to the wide area communication network.

5. The access method as claimed in claim 4, wherein a device administered by the network operator connects to the wireless administration network when the device detects an absence of access to the wide area communication network.

6. An access point for accessing a wide area communication network, wherein the access point is configured to:
detect a wireless administration network dedicated to an exchange of administration data with at least one administration server connected to the wide area communication network; and
when the wireless administration network is detected:
connect to the wireless administration network; and
activate the wireless administration network in repeater mode, in which the access point repeats on the wireless administration network data received on the wireless administration network and when the wireless administration network is not detected:
verify that there is no fault affecting access via the access point to the wide area communication network; and
activate the wireless administration network, allowing direct access to the administration server.

7. A device administered by at least one administration server connected to a wide area communication network, the device comprising a processor and being configured to:
exchange administration data with the administration server;
detect a wireless network dedicated to an exchange of administration data with the at least one administration server; and
connect to the administration network, acting as the backup administration network.

8. The device as claimed in claim 7, wherein the device is further configured to detect a fault affecting access to the wide area communication network, wherein the device is configured to connect to the administration network on the detection of the fault.

9. An administration system comprising the access point of claim 6 and device administered by at least one administration server connected to a wide area communication network, device comprising a processor and being configured to:
exchange administration data with the administration server;
detect a wireless network dedicated to an exchange of administration data with the at least one administration server; and
connect to the administration network, acting as the backup administration network.

10. An access point having stored thereon instructions which, when executed by the access point, cause the access point to perform the method of claim 1.

11. A non-transitory computer readable medium, having stored thereon instructions which, when executed by an access point, cause the access point to perform the method of claim 1.

12. A device having stored thereon instructions which, when executed by the device, cause the device to perform the method of claim 1.

13. A non-transitory computer readable having stored thereon instructions which, when executed by a device, cause the device to perform the method of claim 1.

* * * * *